United States Patent [19]

Cintron

[11] 3,885,217

[45] May 20, 1975

[54] DATA TRANSMISSION SYSTEM

[75] Inventor: Roberto Cintron, Bronx, N.Y.

[73] Assignee: Computer Specifics Corporation, New York, N.Y.

[22] Filed: July 11, 1973

[21] Appl. No.: 378,190

[52] U.S. Cl................... 325/26; 179/1.5 R; 325/32; 325/39

[51] Int. Cl. .............................................. H04l 9/00

[58] Field of Search............... 178/5.6, DIG. 23, 5.1; 179/1.5 R, 1.5 C, 1.5 M, 15 BA, 15 BL, 15 BT; 340/173 A; 360/18; 325/32, 38, 41, 42, 66, 311, 26

[56] References Cited

UNITED STATES PATENTS

| | | | |
|---|---|---|---|
| 1,571,010 | 1/1926 | Kendall | 179/1.5 R |
| 2,286,072 | 6/1942 | Dudley | 179/1.5 R |
| 3,067,280 | 12/1962 | Schlafly, Jr. | 179/1.5 R |
| 3,370,126 | 2/1968 | Scidmore | 179/1.5 R |
| 3,406,344 | 10/1968 | Hopper | 325/66 X |

*Primary Examiner*—Benedict V. Safourek
*Attorney, Agent, or Firm*—Flynn & Frishauf

[57] ABSTRACT

A data transmission system wherein data is superposed on program material with a signal level which is in the noise range. The data is "synchronous" and at the receiving end, the data is synchronously sampled so as to extract same from the program material. The extracted data is then processed so as to, for example, identify the program source material. By using this method, data is superposed on program source material in such a manner that it may be extracted at a receiver without degrading the quality of the program source material.

43 Claims, 10 Drawing Figures

ENCODER

DATA TRANSMISSION SYSTEM

The present invention relates to data transmission systems, and more particularly to a data transmission system for transmitting data via a channel such as an audio channel substantially without disturbing the information already being transmitted on the channel. In addition to audio channels, the present invention is adaptable for transmitting data on channels having other frequency bands.

The present invention has use in many fields, and is particularly useful in an identification system for identifying television broadcasts, broadcasts, of various audio information such as records, tapes, etc. In such systems, it is desired to determine that a particular program material, such as commercial or other broadcast, is being transmitted and it is desired to monitor the air waves to determine the time and frequency of occurrence, of the broadcast of the program material in a given period of time. This is to insure, for example, that advertisers receive the broadcast time for which they have paid.

Many systems have been proposed which transmit identification information on a video channel. However, such transmission systems are extremely complicated and to some degree degrade the video information transmitted on the video channel. Moreover, many of the previously proposed systems have been found to be commercially unacceptable and of poor operational reliability.

The main object of the present invention is to provide a data transmission system for transmitting information in a manner whereby the program material is substantially not disturbed in any manner. A further object of the invention is to provide such data transmission on an audio channel in such a manner that the audio information is substantially not disturbed nor degraded.

a further object of the invention is to provide such a data transmission system in combination with a data recovery system for receiving and interpreting the information transmitted.

A still further object of the present invention is to provide a data transmission system wherein the data is superposed on the program material at a level which is in the noise range, and to provide a data recovery system therefor.

SUMMARY OF THE INVENTION

Briefly, in accordance with the present invention, the data transmission system for use in conjunction with program source material, preferably audio source material, comprises means for repeatedly superposing a data signal on the program source material to form a combined signal, the data signal being synchronous and having an amplitude level within the range of the noise appearing in the program source material. The noise may either be due to ambient noise or due to noise already on the program source material signal. In order to extract the superposed data signal from the combined signal, receiving means is provided for synchronously sampling the combined signal at a frequency which is a multiple of the frequency of the synchronous data signal. Further provided is means for storing the value of the respective samples of the bits of the data signal and means for adding a sample corresponding to a given bit of the data signal with the previous samples corresponding to that given bit of the data signal. When the algebraic sum of the data signal corresponding to given bits reaches a predetermined level, this indicates the presence of valid data and the data is fed to an output utilization means.

In accordance with a feature of the present invention, a logarithmic amplifier is provided in the input portion of the receiving means for improving the signal-to-noise ratio, thereby improving the reliability of the extraction of data.

DETAILED DESCRIPTION OF THE PREFERRED EMBODIMENTS

Figure 1:
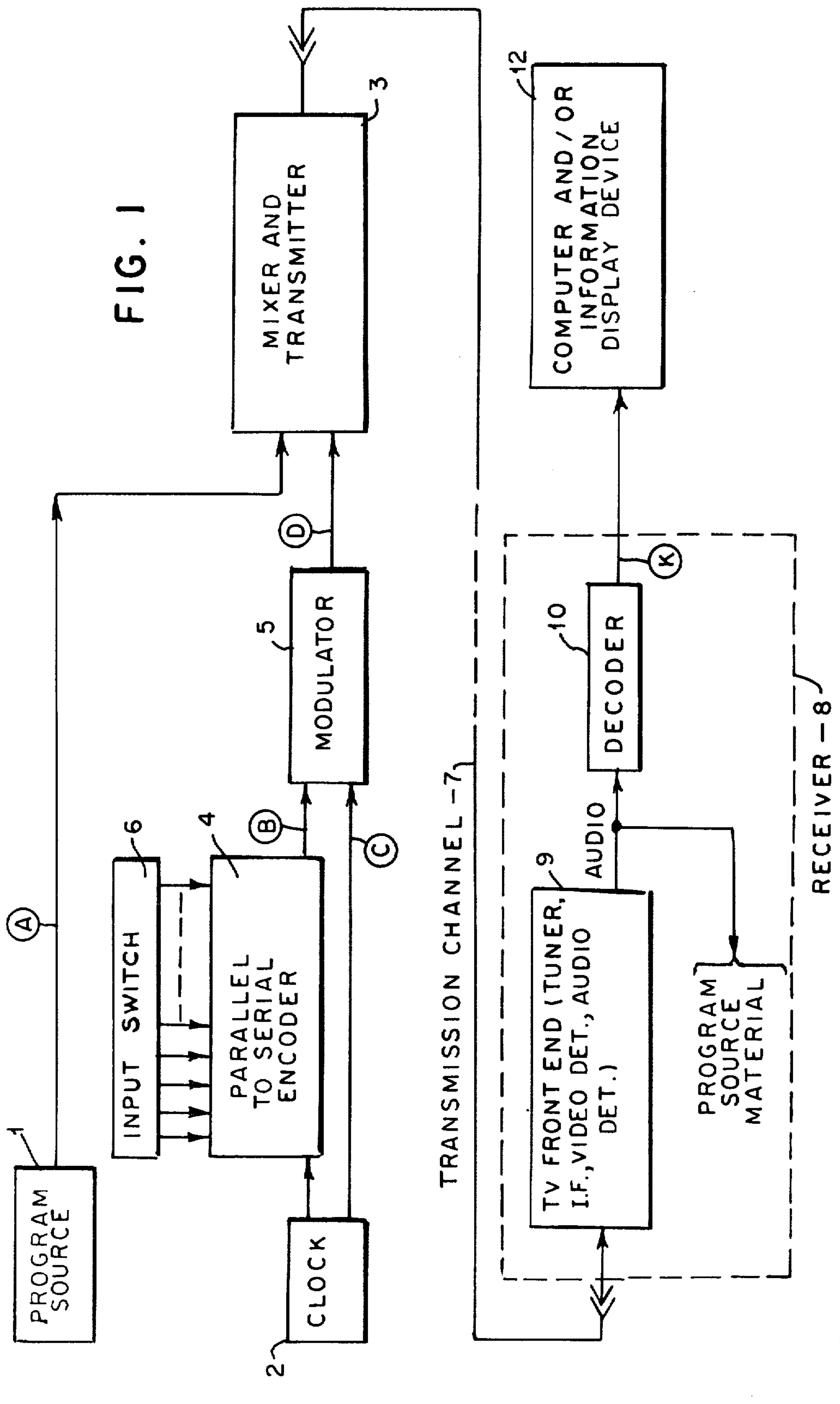
FIG. 1 is a basic block diagram of a data transmission system according to the present invention.

FIG. 1 illustrates in block diagram form a typical subsonic (i.e. audio) data transmission system for use, for example, to superimpose identification data on an audio channel which carries a predetermined program source. The data is superposed on the audio channel such that the amplitude of the data signals are within the noise range. The system illustrated in FIG. 1 is shown in connection with a television transmission arrangement. However, the system is clearly adaptable for use in radio transmission, for putting identification data on pre-recorded records, tapes, ets., and the like. The system of the present invention superimposes data onto the program material, which data can be detected at a receiver to determine that a particular program source has been transmitted over the air waves, or otherwise reproduced, so as to identify the particular program source and to store the information with regard to the time of occurrence, the identification and frequency of transmission of a particular program source over a given period of time. Any other desired information can be transmitted and picked up with the system of the present invention, as dictated by system requirements. The present invention is particularly useful in monitoring the transmission of commercials on radio and television, and for monitoring the playing of recorded music.

Referring to FIG. 1, an apparatus for superposing data onto the signal representing program material from a program source 1 includes an input means 6 which defines the data to be superposed on the program material. In a simple case, the input means comprises a plurality of thumbwheel switches, each of which is setable to a particular number, whereby the data to be superposed on the program material comprises a series of numbers. The numbers could be used to identify the program material. The input means 6 is coupled to a parallel-to-serial encoder 4 which converts the parallel information from the input means into serial information. The encoder 4 is driven by a clock 2. It should be clear that if the input data is already in serial form, the provision of the encoder 4 will be unnecessary.

The output of the encoder is fed to a modulator 5 along with an output from the clock 2. The output of the modulator 5 and the output of the program source 1 are fed to a mixer and transmitter 3, or other mixer and output utilization device. The output of mixer and transmitter 3 is then transmitted, for example over the air waves. The output of the transmitter contains signals corresponding to the program source and also data signals corresponding to the identification of the program source, or other pertinent data.

At a receiver 8, in the case of a television system, the input dignal is fed to a normal television front end which comprises, for example, the tuner, I.F. video detector and the audio detector. The output of the TV front end 9 is an audio output signal which carries both the program source material and the data which was superposed thereon. Since the data is superposed on the program source material signal at a level in the range of the ambient noise which is always present, the output of the audio detector of the TV front end 9 can be processed for playing the program source material in the normal manner without being degraded or otherwise altered by the superposed data. In order to extract the data from the output of the TV front end, the output thereof is fed to a decoder 10, the output of which is fed to an output utilization device, such as a computer and/or an information display device. The decoder 10 will be described in more detail with reference to FIG. 3.

The concept upon which the present invention is based is that the original data is superposed on the program source material at a signal level which is in the range of the ambient noise appearing in the program source signal. The data is inserted in a synchronous manner and on the receiving end, in the decoder 10, the signal with the data superposed thereon is sampled in accordance with the sampling theorem so as to derive the data from the noise. According to the sampling theorem, the synchronously applied data can be derived (i.e., extracted) from the received signal in a very accurate manner. This is based on the fact that noise is random and that the data which is superposed on the signal is synchronous and "regular" in nature. By synchronously sampling the signals at the receiving end, the data can be accurately extracted from the received signal. In connection with the sampling theorem, reference is made to the text "Information Transmission Modulation And Noise", Mischa Schwartz, McGraw-Hill, 1959.

In accordance with the present invention, the data is repetitively superposed, in a serial fashion, on the program source signal. In addition to the data, a synchronizing signal is generated and is likewise transmitted. In a typical system for use in monitoring television commercials or other television programs, the data is preferably repeated, serially, at least about 100 times. In the embodiment described in detail herein, the data is repeated at least 144 times for a given program. In the described system for use with television commercials, for example a 10 second television commercial, a 32 bit data unit is superposed on the sound track of the commercial in about one twenty fourth of a second. The on-time of the sound portion of the commercial is about 6 seconds. Therefore, the data unit of 32 bits is repeated about 144 times at the transmission end. At the receiver, the information is synchronously sampled and the results of sampling each data unit of 32 bits is serially fed into a digital memory and comparator. The result of sampling each successive data unit is added to the result of sampling the previous data unit and when a predetermined number of signals are added together, the detected signal level of each bit reaches a predetermined amplitude which indicates proper reception of a data unit. This concept will become more apparent from the detailed discussion of FIGS. 2–4 below.

Figure 2:
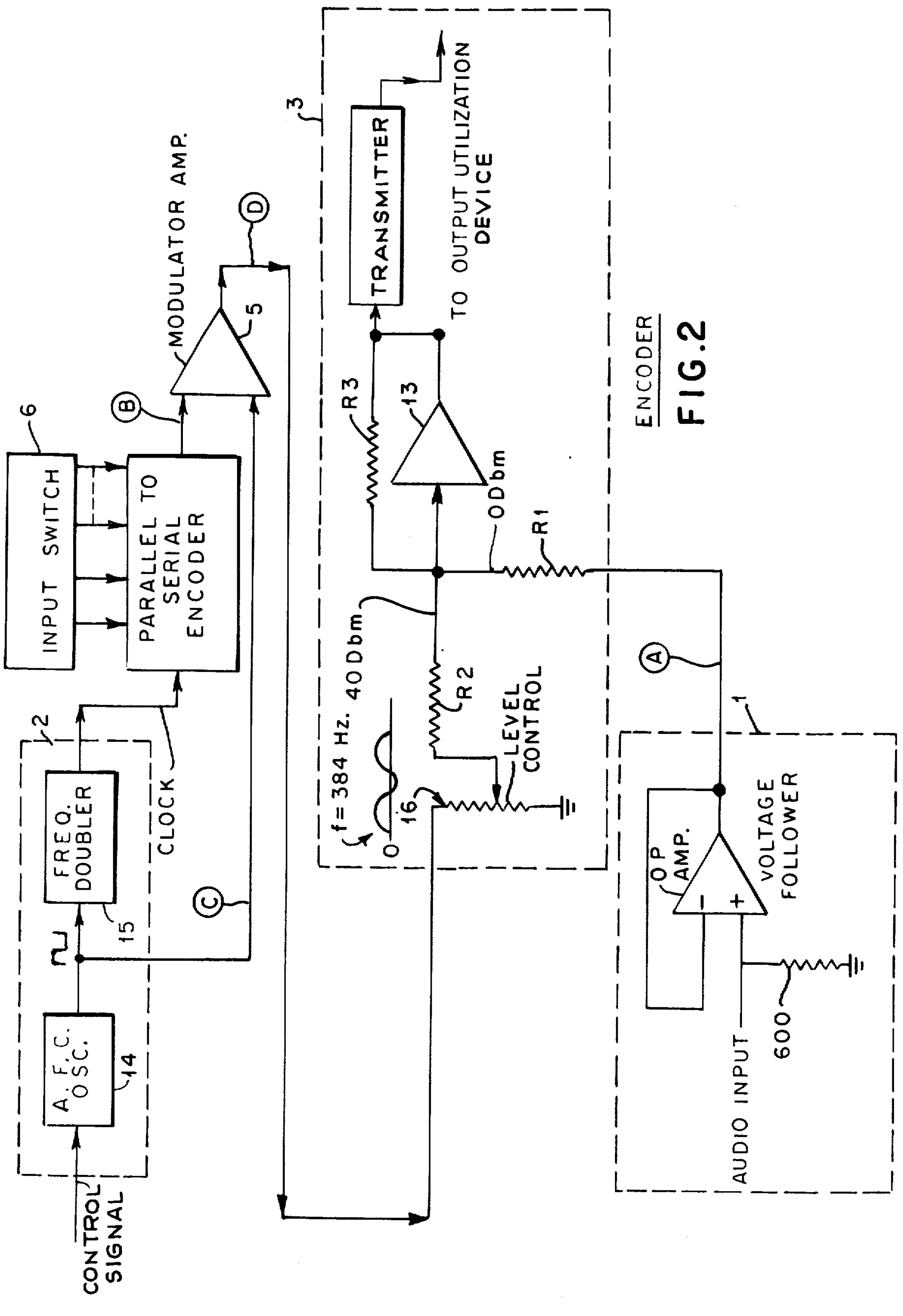
FIG. 2 illustrates the encoder or transmission portion of the embodiment of FIG. 1 in greater detail.

Referring now to FIG. 2, there is shown an encoder device according to the present invention which is particularly adaptable for use in a television transmission system. The encoder of FIG. 2 is useful also for encoding pre-recorded program material or for superposing the data with a program source. In the second instance, the output utilization device included within element 3 of FIG. 2 would be a recording device, or a transmission device.

In the detailed description of FIG. 2, it will be assumed that the output utilization device is a recorder such as a magnetic tape recorder used for the sound track of television programming devices or the recording apparatus associated with the sound track appearing on motion picture film. The audio input program material source is represented by block 1 and the output thereof is fed to an input of the mixing amplifier 13 via a resistor R1. The input level of the audio input signal is considered to be at ODbm. The clock signal which is fed to the parallel-to-serial encoder 4 is generated by means of an oscillator 14 which receives a synchronization control signal, such as a signal synchronized from the 60 Hz line frequency or a synchronization signal from a movie projector. The output of the oscillator 14 is fed to a frequency doubler 15, the output of which represents the clock signal fed to the parallel-to-serial encoder 4. The output of the oscillator 14 is fed to an input of the modulator amplifier 5. The output of the parallel-to-serial encoder 4 is coupled to the other input of the modulator amplifier. The waveforms at points A–D in FIGS. 1 and 2 are illustrated in FIGS. 5A–5D.

The output of the modulator amplifier 5 is fed to the mixing amplifier 13 via a level controller 16 and a series resistance R2. The resistances R1 and R2 are coupled together and are then coupled to the input of operational amplifier 13, which includes a feedback resistor R3. The ratio of the resistances of R1 and the sum of the resistance R2 and the resistance of the level controller 16 determines the ratio of signal levels of the data and the program source material. In a preferred embodiment, R1=R2 and the level controller 16 and resistance R2 have values such that the data signal applied to the mixing amplifier 13 has a level of −40 Dbm. The output of the mixing amplifier 13 is fed to the output utilization device which may be a recording device, a transmitter, etc.

As mentioned hereinabove, in a typical embodiment especially for use in identifying a program source, the data unit is comprised of 32 bits. Preferably, 24 bits are utilized to represent the identification number corresponding to the program material, and 8 bits are used as synchronization bits. How the synchronization bits are utilized in the present invention will become more apparent from the following discussion of FIG. 3.

Figure 3:
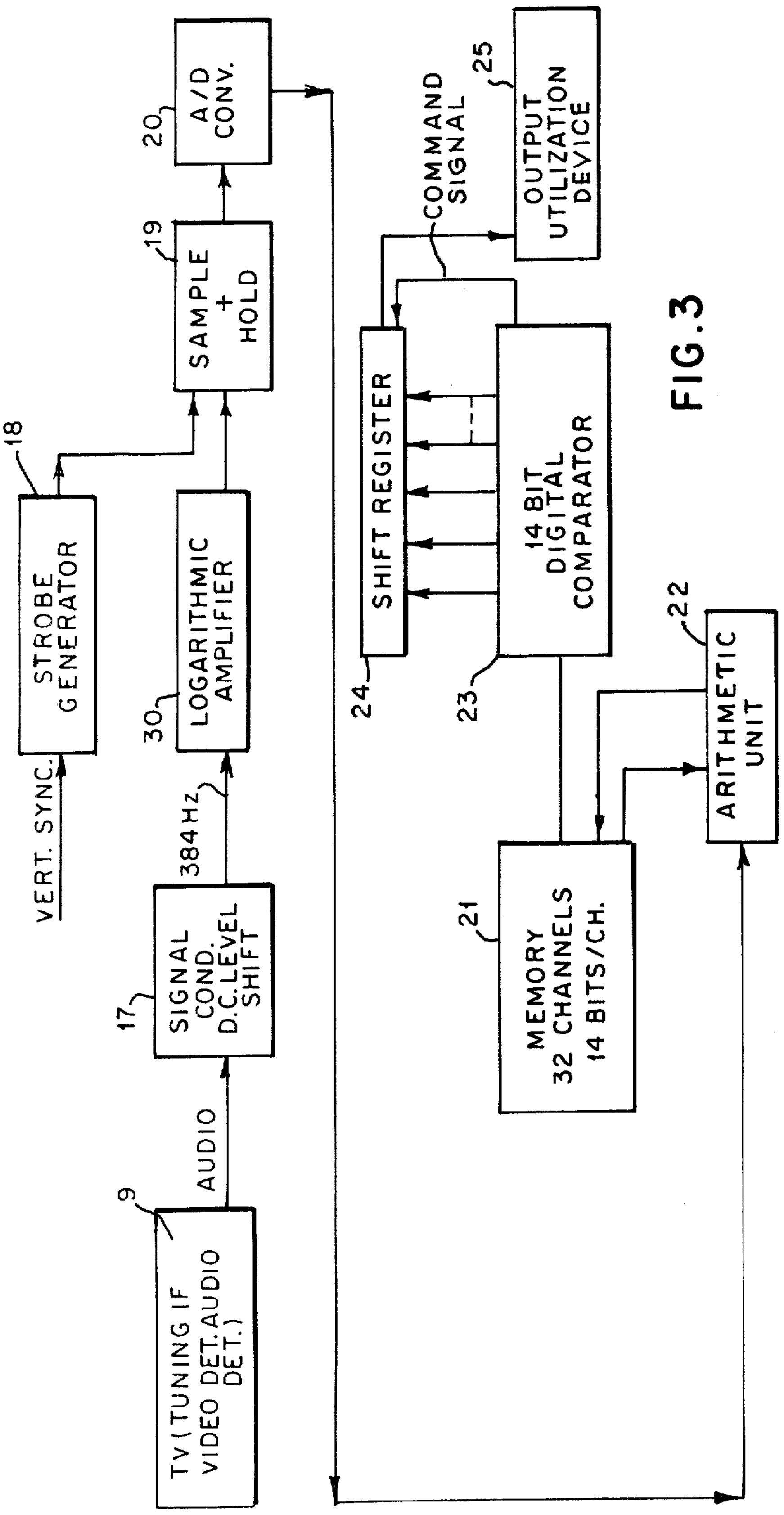
FIG. 3 illustrates the receiving apparatus of the system of FIG. 1 in greater detail.
Figure 6:
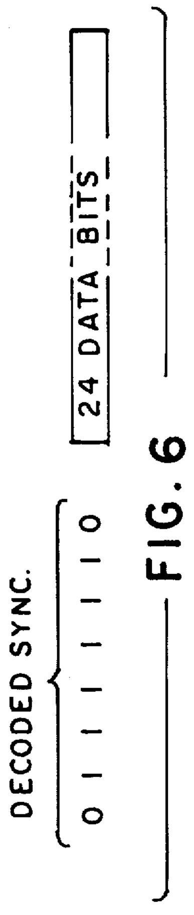
FIG. 6 illustrates a data signal format used in the illustrated embodiment of the invention.
Figure 5A:
FIG. 5 illustrates waveforms at the various indicated points in the block diagrams of the present invention.
Figure 5B:
Figure 5C:
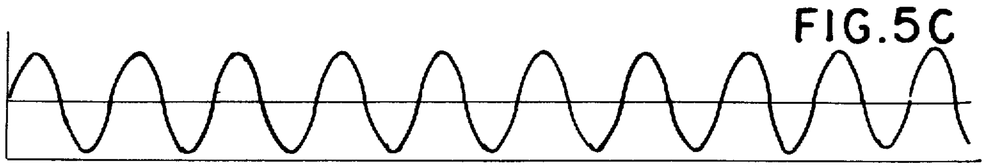
Figure 5D:
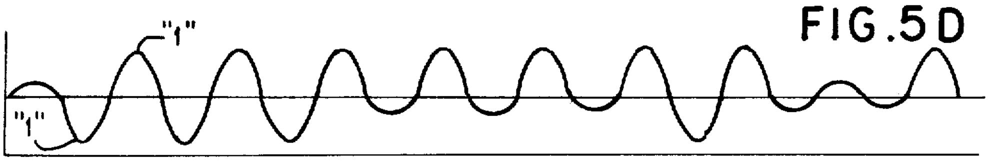
Figure 5E:
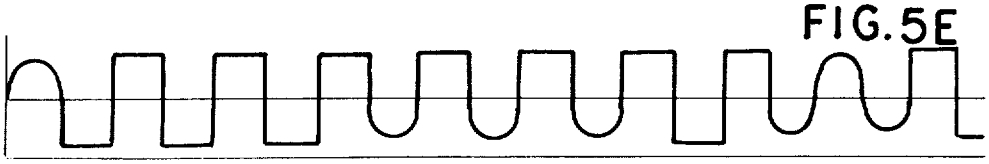
Figure 5F:
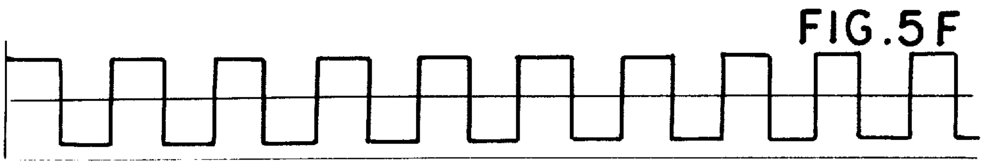
Figure 5G:
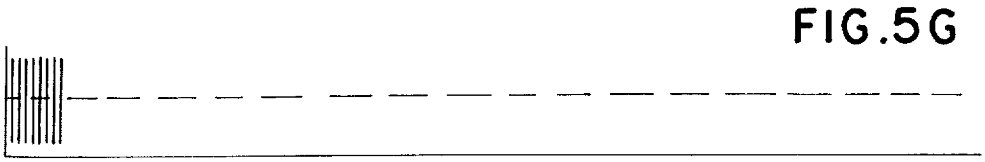
Figure 5H:
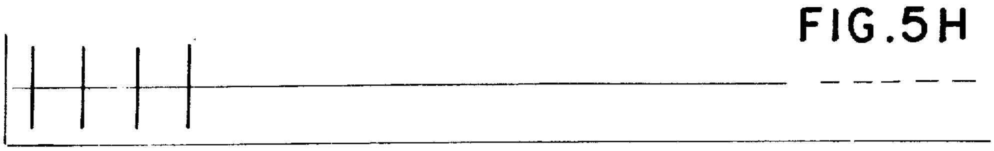

FIG. 3 illustrates in greater detail the receiving and decoding system according to the present invention. Referring to FIG. 3, the audio output from the front end of the television, for example, is fed to a signal conditioner (a DC level shift circuit) 17, the output of which is fed to a logarithmic amplifier 30. The logarithmic amplifier 30 is preferably provided especially in systems wherein the sound track is of short duration. The function of the logarithmic amplifier 30 is to improve signal-to-noise (S/N) ratio and will be discussed in detail hereinbelow. The output of the logarithmic amplifier 30 is fed to a sample and hold circuit 19, the design of which is conventional. A strobe generator 18 is provided which causes the input signal to be strobed (i.e. sampled) by the sample and hold circuit 19 at a rate high enough so that each pulse which represents a bit of data is strobed 8 times during its time duration. This is the "search" mode of the strobe generator wherein the peak of the data signal is being "looked" for. By virtue of this high frequency strobing, the chances of sampling a data bit at substantially the peak of its signal level is improved. In this particular embodiment, with a bit rate of 384 Hz, the strobe generator strobes at a frequency of 768 × 8 = 6144 strobes per second. The reasons for doubling the strobe rate relative to the frequency rate is that both the positive and negative halves of the subcarrier wave are used for encoding data. See FIG. 5D. After the peak of the data bit is found, the strobe generator then becomes "phase locked" to the input signal and is switched to its "normal mode" wherein each bit is strobed only once. FIGS. 5G and 5H illustrate the strobe signals in the "search" and "normal" modes respectively. The output of the sample and hold circuit 19 is fed to an analog-to-digital (A/D) converter 20. The output of A/D converter 20 is fed to an arithmetic unit 22 (i.e., an add, subtract, unit) which adds or subtracts the value of the most current sample to the sum value of the previously accumulated samples in the memory 21 and then places the new algebraic sum value back in memory. The output of the memory 21 is coupled to a 14 bit digital comparator 23 which compares the sum values of the bit samples with a fixed level. The bits are compared serially by word, but in parallel with respect to the bits representing a sample amplitude value. After a plurality of samples of each bit, the algebraic sum of the plurality of samples of each bit strobed in the memory storage locations should reach a predetermined value at which time the digital comparator 23 will issue a "data complete command". The data will then be stored in 32 bit circulating shift register 24. The encoding format (i.e., the data stored in register 24) is illustrated in FIG. 6. The shift register 24 is circulated until the "decode sync" circuitry senses the proper orientation of the signals — that is, until the signals are oriented as shown in FIG. 6. This is easily accomplished by detecting the first 8 sync bits "01111110", and then stopping circulation of register 24 when the sync bits are oriented in the first eight positions of the register 24. Such detection is carried out by, for example, preset gates. The output of the shift register 24 is fed to an output utilization device 25 on a serial or parallel basis, as desired, which output may be a display device and/or a computer, etc. to interpret the output data. The utilization device 25 may also keep track of and store the time of playing of the identified program material and any other pertinent information, and process and/or display the information.

Figures 4, 9:
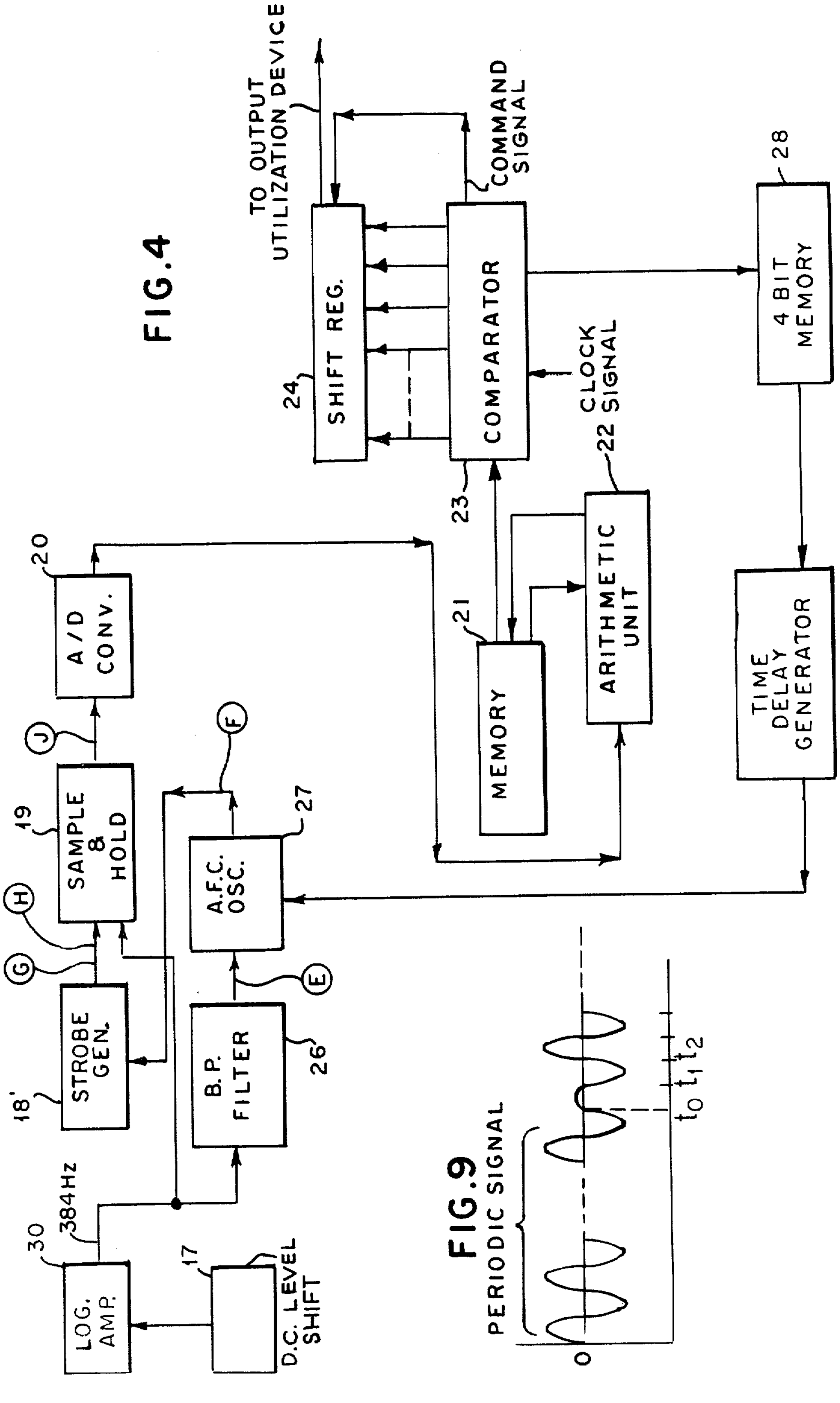
FIG. 4 illustrates a modified receiving apparatus.
FIG. 9 illustrates a synchronizing signal for use in the present invention.

FIG. 4 illustrates an alternate arrangement for synchronizing the strobe generator 18', other than using the vertical sync pulse of the television system or other available sync pulses. The 384 Hz signal (i.e. FIG. 5D) is filtered out form the audio output signal by a filter 26 (band pass) and this 384 Hz filtered signal is used to control an AFC oscillator 27. The modification illustrated in FIG. 4 shows only the pertinent portions of the embodiment of FIG. 3, as modified. The output of the AFC oscillator 27 is fed to the input of the strobe generator 18'so as to synchronize same.

Figure 5J:

The sample and hold circuit 19 effectively "AND's" the strobe signals with the audio signal fed thereto. See FIG. 5J. Due to the nature of the synchronous strobing and the sampling operation, the data signal is effectively derived or extracted even though the amplitude thereof is well within the noise level.

Since the data which is encoded on the combined signal (the combined signal meaning the data signals superposed on the program source material signal) is about 40db below the level of the sound track, that is, the data signals amount to about one one-hundredth of the total peak voltage amplitude, the number of samples required to obtain a suitable signal-to-noise ratio (S/N ratio) of about 1.44 to 1 would be approxamately 144. This assumes that the "noise" ( ambient noise plus the sound material appearing in the program source material itself) is "white noise", that is, varifying randomly in frequency and phase and is of a constant magnitude. Since this is not the case in a practical system, the noise component of each sample may not exactly cancel the noise component of the previous samples so that the required number of samples is actually greater than 144 in order to obtain an S/N ratio of 1.44 to 1. At this point it is noted that the arithmetic unit 22 algebraically adds the value of a given sample of a given bit with the previous samples of the same given bit and then stores the algebraic sum back into a predetermined location in the memory 21. This is done for each bit and for each sample of each bit.

In a practical application, for example with a television commercial having a time duration of about 10 seconds, with a 6 second duration program sound track, using the frequencies of the particular embodiment described herein, the total number of samples of each bit available is 144. This poses a problem if the sample components due to the encoded signal are all to be at a level of −40db. In this event, it is difficult to insure that accurate decoding of the data by the sampling technique will be accomplished.

Several solutions to this problem are available. The simplest solution would be to increase the number of samples by lengthening the encoding interval. This is entirely possible in the case of longer program materials, for example a thirty second commercial or on the encoding of phonograph records wherein at least two minutes are available for encoding. However, in the case of a short duration program material, the lengthening of the encoding interval is impossible.

Another possible solution is to increase the subcarrier frequency (that is, the frequency of the clock 2) to a multiple of 384 Hz. However, this would place severe constraints upon the mechanical portion of the transmission equipment, that is severe mechanical restraints would be placed on a movie projector, tape recorder, phonograph, or the like, which is used for recording the program material. This is because the accuracy of the sub carrier is affected by the mechanical factors such as "flutter " and "wow" for tape recorders, and the registration of the film sprockets for movie projectors. Thus, while in some systems increasing the subcarrier frequency would be a viable solution, it is generally unacceptable.

Figure 7:
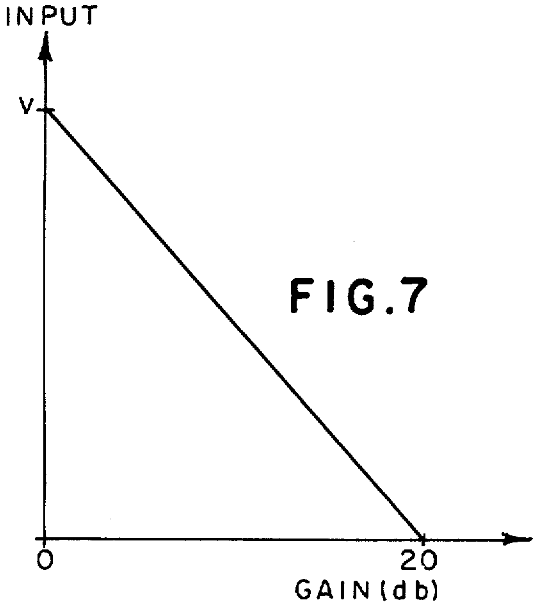
FIG. 7 illustrates a typical transfer characteristic of the logarithmic amplifier used in an embodiment of the invention.

In accordance with a feature of the present invention, the above difficulty is solved by providing a logarithmic amplifier 30 between the output of the signal conditioner 17 and the input of the sample and hold circuit 19. See, for example, FIGS. 3 and 4. Since the level of the audio signal carrying the encoded data varies from about −50dbm to about Odbm, the "noise" component of a given sample could also be from about −50dbm to 0dbm. By using a logarithmic amplifier 30 with, for example, a 20db differential gain range, the encoded signal will be greatly amplified during a "lull" or a "lull-signal" portion of the program material. Conversely, the amplitude of the noise component will be greatly reduced (that is, the gain of the amplifier will be very low) during such periods when the program material content is at a high level (close to Odb). Thus, the low level signals are amplified to a greater degree than the high level signals, thus reducing the effects of large noise and program material signals on the sampling system of the invention. This effectively increases the S/N ratio of the system and enables accurate extraction of the data to be accomplished with a fewer number of samples. A typical transfer characteristic of a logarithmic amplifier 30 for use in the present invention is illustrated in FIG. 7. Logarithmic amplifiers having such gain characteristics are readily available in the art and a further discussion thereof in connection with the present application thereof is omitted.

In order to further insure synchronization of the strobing and sampling system at the receiving end, it is preferred to superpose a periodic signal, such as a sine wave, on the program material for a predetermined period of time prior to the transmission of data. See FIG. 9 and the discussion below.

Figure 10:
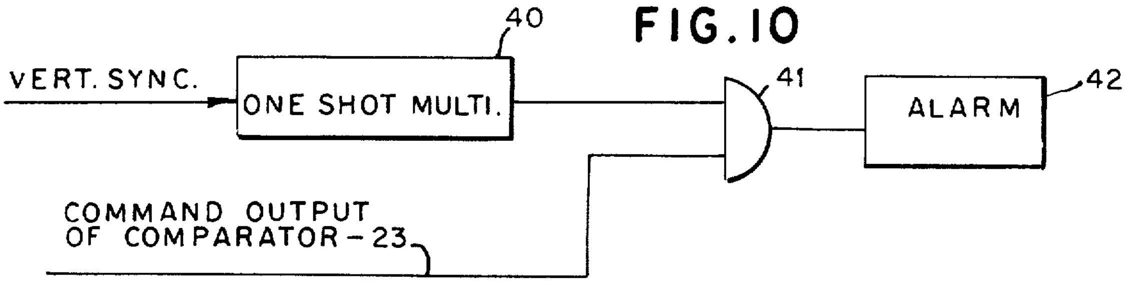
FIG. 10 is a block diagram of means for indicating the lack of a video signal in a system according to the present invention adapted for television use.

Referring to FIG. 10, a further feature of the invention is illustrated whereby the apparatus of the present invention can detect the lack of a picture in the transmission of program material when the present invention is applied to a television type system. When a receiving system along the lines of FIG. 3 is used, a failure in the video portion of the signal can be detected since the vertical sync signal fed to the strobe generator 18 will not be present. Thus, if the vertical sync signal is not present, the strobe generator 18, which is shown in more detail in FIG. 8, will be inoperative and the system will fail to detect the presence of the program material. Thus, the system of FIG. 3 has a built-in video signal detector.

When the system along the lines of FIG. 4 is used, a separate circuit such as shown in FIG. 10 is utilized to detect a failure in the video portion of the program source being monitored. In accordance with FIG. 10, the vertical sync signal of the received television signal is fed to a retriggerable one-shot multivibrator 40 which has a time delay of about 20.0 ms. The time spacing between successive vertical sync pulses in a television system is approximately 16.7 ms and a time delay of 20.0 ms in the multivibrator 40 is sufficient. The output of the multivibrator 40 is fed to an AND gate 41 which also receives the commond output of the comparator 23. Until the comparator 23 detects the presence of valid data, the input line from the comparator 23 fed to the AND gate 21 is considered to be a "1". As long as the vertical sync pulses are fed to the one-shot multivibrator 40 at a repetition rate such that the time duration between adjacent vertical sync pulses is less than 20.0 ms, the output thereof will be a "0". If a failure in the vertical sync pulses occurs, which indicates a failure in the video portion of the television signal, the output of the multivibrator 40 will change and will thus enable the gate 41, which will trigger an alarm indicator means 42. It should be clear that the alarm indicator means 42 may be a separate alarm indicator, or may be embodied in a computer program which monitors the output signals from the system of the present invention. When the output of the AND gate 41 indicates a failure in the video signal, this data is detected and interpreted appropriately by the output utilization means. With the apparatus of FIG. 10 in conjunction with the apparatus of FIG. 4, it is possible to detect the fact that the video signal failed, but the audio signal is properly operating. In the embodiment of FIG. 3, a failure in the video portion of the signal will also cause the system to fail to detect the data in the audio portion and will therefore merely indicate a complete failure of proper transmission. FIG. 9. Thus, at the receiving end, the synchronizing periodic signal can be detected so as to "pre-synchronize" the receiving system with the incoming data to insure more accurate derivation or extraction of information. This enables the receiving system to become phase locked with the input data signal. Thus, the probability of the strobing signal from the strobe generator coinciding with the approximate peak position of the input data signals is improved. In this connection, it is noted that the synchronizing periodic signal also has an amplitude which is in the noise region. Due to the sampling characteristics of the present invention, it is possible to accurately derive out the synchronizing signals so as to insure proper operation, as should be apparent. The above-described periodic signal may be omitted if synchronization can be reliably achieved without same in a given application of the system.

In television commercials, the first few seconds are generally silence. That is, no audio is transmitted during the first several seconds. This is an ideal time to transmit the synchronizing periodic signal. Since the synchronizing signal is within the noise range, it is completely inaudible at the receiving end, but is extractable as data information by virtue of the sampling technique. A typical periodic synchronizing signal is illustrated in FIG. 9. The data signal of FIG. 5D, for example, is generated at the end of the periodic signal.

The strobe circuits 18 and 18' have two operational modes, "search" and "scan". The operation of circuit 18' will be described with reference to FIGS. 4 and 8. Circuit 18 may be similar. Normally, the strobe circuits are in the search mode. In this mode the strobes are repeated at a rate of 6144 strobes per second. Memory locations "0" through "15" of memory 21 are used to store the information in the following manner:

| | |
|---|---|
| STROBE "0" | memory location "0" |
| "16" | " |
| "32" | " |
| "48" | " |
| "64" | " |
| STROBE "1" | memory location "1" |
| "17" | " |
| "49" | " |
| "65" | " |

In the search mode, the output of the memory 21 locations are compared in the digital comparator 23 to a preset number and when any one location exceeds this value, the address of that particular memory location is stored in a 4 bit memory 28 of FIG. 4. This number is used to generate a time delay which is used to correct the phase of the "sync" signal output of oscillator 27. The strobe generator 18 then switches to the scan mode.

In the scan mode there are 728 strobes per second generated.

Memory 21 locations "0" through "31" are used for storing data in the following manner:

| | |
|---|---|
| STROBE "0" | location "0" |
| "1" | location "1" |
| STROBE "31" | location "31" |
| strobe "32" | location "0" |
| "33" | "1" |
| strobe "65" | location "31" |

Figure 8:
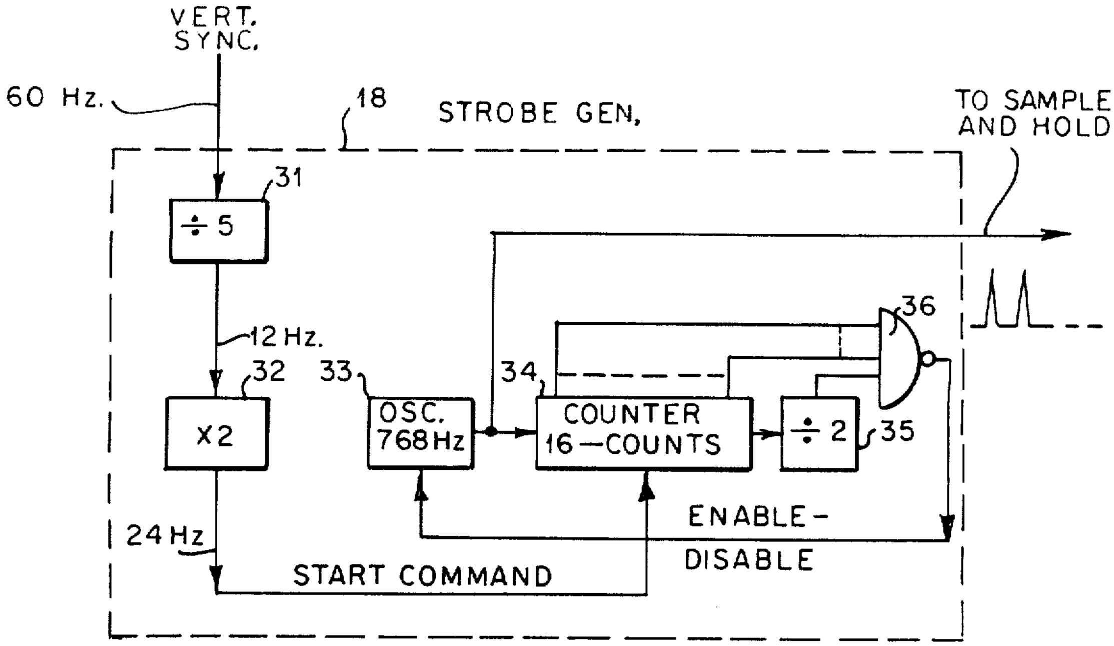
FIG. 8 is a block diagram of a strobe generator for use in the embodiment of the invention illustrated in FIG. 3.

Referring to FIG. 8, a portion of a typical strobe generator 18 includes an input for a vertical synchronizing signal (60 Hz) which is present in television systems and in various other systems. The 60 Hz synchronizing signal must be converted to 24 Hz signal which corresponds to the repetition rate of a block of data in the present embodiment. In television systems, the video information is transmitted at a rate of 24 movie film frames or 60 video frames per second, and, in accordance with the present invention, the block of data is superposed on each frame. If the data was superposed, for example half on one frame and half on the next frame, difficulties could possible arise in synchronization, if the movie film was later edited and an odd number of frames were removed.

The strobe generator 18 further includes an oscillator 33 operating at 768 Hz, the output of which is fed to a counter 34 which is set to count to the number 15. The overflow output of the counter 34 is fed to a divide by 2 divider 35, and the outputs of the counter representing the number 15 and the output of the divider 35 are fed to an AND gate 36 which detects when 32 counts corresponding to 32' pulses of the oscillator 33 have been generated.

The oscillator 33 has an "enable-disable" input which selectively enables or disables the oscillator. The output of the strobe generator 18 is the output of the oscillator 33. After 32 pulses or counts of the oscillator have been generated, AND gate 36 becomes enabled and the output thereof disables the oscillator 33. Each pulse of the output of multiplier 32 clears the counter 34, thereby disabling AND gate 36 which in turn enables oscillator 33 so that the next series of 32 strobe pulses are generated. This cycle is repeated during the operation of the apparatus of the present invention in order to repeatedly generate 32 pulses for each cycle of the 24 Hz signal appearing at the output of the multiplier 32 which corresponds to the frame rate of the embodiment of the invention described herein.

The above-described operation of the strobe generator was in connection with the normal strobing mode. When the system is in the search mode, the output of the oscillator 33 is used to trigger a similar oscillator and counter device (similar to elements to 33–36) to generate 8 strobes for each output pulse of the oscillator 33. Since this portion of the circuit is substantially identical with the above-described portion, the search mode is not further described.

In accordance with a further feature of the present invention, the synchronous data signals (illustrated, for example, in FIG. 5D) are generated such that a 1 is represented by a full amplitude signal and the 0 is represented by a lower amplitude signal level. This is contrary to a conventional binary system wherein the 0 level is represented by a signal having a 0 amplitude relative to a given reference level. In accordance with the present invention, by providing the 0 representation as a low amplitude signal having a positive, predetermined low amplitude, more reliable synchronization is acheived. The provision of the low amplitude representation of the 0 generates additional synchronous information which is detected and which improves the synchronizing capability of the present invention, especially in high noise environments. See FIG. 5E.

It should be clear that the encoding apparatus, such as shown in FIG. 2, may be fabricated as an individual encoding unit for use in producing encoded program material. For example, in such an instance, the audio input material would have data superposed thereon, and the output utilization device would comprise another recording device, such as sound motion picture recorders, tape recorders, records, or the like, to produce a permanently recorded encoded program source signal. Then, the encoded signal can be transmitted using any conventional transmitter and the data can be extracted therefrom using a receiver such as shown in FIGS. 3 and 4. Thus, the encoding apparatus built along the lines of FIG. 2 has utility in and of itself. Likewise, assuming that encoded signals are being transmitted, the receiving and decoding apparatus has individual utility.

While the above-described embodiment of the invention has been described in connection with digital apparatus, it should be clear that analog apparatus can be used to carry out the present invention. For example, in the illustrated embodiment, the output of the sample and hold circuit is fed to a digital arithmetic unit and comparison device. Alternatively, this can be done in an analog manner by generating analog signals corresponding to the level of the samples, and then adding the analog signals together in an analog adder and storing the resultant algebraic sum in an analog storage device, such as a capacitor. The comparison of the sum values and the predetermined level can also be done in an analog manner, as should be apparent to those ordinarily skilled in the art to which the present invention pertains. It should be clear that various other digital devices described herein could be replaced, if desired, with analog devices performing equivalent functions.

While the present invention has been discussed above in connection with specific apparatus, it should be clear that various modifications and alterations may be made thereto within the spirit and scope of the present invention as defined in the appended claims.

I claim:

1. A data transmission system for transmitting data in conjunction with a program source material signal comprising:

means for repetitively superposing the same data signal on the program source material signal to form a combined signal, said data signal being synchronous with a given frequency and having an amplitude level within the amplitude range of the ambient noise appearing in said program source material signal;

means for transmitting said combined signal;

means for receiving and operating on said combined signal to extract said data signal from said combined signal, said receiving means comprising:

synchronous sampling means for amplitude sampling said combined signal in synchronism with the synchronous frequency of said data signal;

generating means coupled to said synchronous sampling means for generating signals corresponding to the amplitude values of respective samples of said data signal;

storage means;

arithmetic means coupled to said storage means and to said generating means for adding the amplitude value of a sample corresponding to a given portion of the data signal received from said generating means with the algebraic sum of the sample amplitude values corresponding to the previous occurrences of said given portion of the data signal during the previous repetitive occurrences of said data signal, said algebraic sum being received from said storage means, and for storing the resulting algebraic sum values of said samples in said storage means;

means coupled to said storage means and responsive to said sum values of said data signal samples reaching a predetermined level for indicating the presence of valid data; and output utilization means for generating a representation corresponding to said valid data.

2. A data transmission system according to claim 1 wherein means for superposing said data signal on said source material signal comprises means for generating a data signal which includes a repetitively generated group of signals.

3. A data transmission system according to claim 2 wherein said data signal generating means includes means for generating said group of signals which include a group of digital data signals, said group forming a data unit, said data unit being repetitively and sequentially superposed on said program source material signal.

4. A data transmission system according to claim 3 wherein said data signal generating means includes means for generating said digital signals having a frequency in the audio range, and wherein said program souce material is in the audio range.

5. A data transmission system according to claim 3 wherein said data signal generating means includes means for generating said group of digital data signals which include a plurality of signals selectively having an amplitude of a predetermined level 1 and an amplitude at a second predetermined level 0 which is lower than said first predetermined level so as to enhance synchronous sampling at said receiving means.

6. A data transmission system according to claim 1 wherein said means for repetitively superposing said same data signal on said program souce material comprises:

synchronous clock means for generating a clock signal having a predetermined frequency and which is synchronous with said given frequency;

means for generating coding signals; and encoding means responsive to said coding signals and to said clock signal for generating serially encoded data signals.

7. A data transmission system according to claim 6 wherein said superposing means further includes means responsive to said generating means and to said program source material signal for mixing said serially encoded data signals with said program source material signal.

8. A data transmission system according to claim 7 wherein said mixing means includes level control means for mixing said signals such that the data signal is about 40 Db below the amplitude level of program source material signal.

9. A data transmission system according to claim 1 wherein said synchronous sampling means includes means for generating a synchronized clock signal and a sample and hold circuit means responsive to said synchronized clock signal and to said combined signal for sampling said combined signal.

10. A data transmission system according to claim 9 wherein said synchronized clock signal generator includes means responsive to an external synchronizing signal for generating said synchronized clock signal.

11. A data transmission system according to claim 9 wherein said synchronized clock signal generating means include a band-pass filter means for filtering a predetermined frequency signal from said combined signal, said predetermined frequency corresponding to the synchronous frequency of said data signal; a controlled oscillator responsive to the output of said band-pass filter for generating a synchronizing signal; and means responsive to said synchronizing signal for generating said synchronized clock signal.

12. A data transmission system according to claim 1 wherein said receiving means includes variable gain amplifier means coupling said combined signal to said synchronous sampling means.

13. A data transmission system according to claim 12 wherein said variable gain amplifier means comprises a logarithmic amplifier.

14. A data transmission system according to claim 1 wherein said synchronous sampling means includes means for generating a synchronized clock signal of a first predetermined frequency, and a means for generating a synchronized clock signal of a second frequency substantially higher than said first frequency; and means for selectively sampling said combined signal at one of said frequencies.

15. A data transmission system according to claim 14 wherein said synchronous sampling means includes means for sampling said combined signal at said second frequency to detect a peak value of a data bit which is part of said data signal.

16. A data transmission system according to claim 15 wherein said synchronous sampling means includes means responsive to said peak value detecting means for detecting the phase of the peak value of the data bit; and means for correcting the phase of said synchronized clock signal of said first predetermined frequency as a function of the phase of the peak value of the data bit.

17. A data transmission system according to claim 1 comprising an analog-to-digital converter means coupled between said sampling means and said storage means.

18. A data transmission system according to claim 1 comprising an analog-to-digital converter coupling the output of said sampling means to said arithmetic means.

19. A data transmission system according to claim 1 wherein said means responsive to said sum values for indicating the presence of valid data comprises a digital comparator for comparing a sum value with a predetermined level; and shift register means coupled to the output of said comparator for storing valid data output from said digital comparator.

20. An encoding device for repetitively superposing an audio frequency data signal on an audio program source material signal to form a combined signal comprising:

means for generating a synchronous clock signal which is synchronous with a given frequency;

means for generating data signals corresponding to data;

modulator means coupled to said data signal generating means and to said clock signal generating means, and responsive to said data signals and synchronous clock signal for generating a synchronous modulated data signal which is modulated in accordance with said data signal; and mixing means for mixing the output of said modulator means and said audio program source signal for producing a combined signal of said data and said audio program source signal, said modulated data signal having an amplitude level within the amplitude range of the ambient noise appearing in said audio program source signal.

21. An encoding device according to claim 20 wherein said mixing means includes means for adjusting the amplitude level of said modulated data signal such that the amplitude level of said modulated data signal is about 40 Db below the level of said audio program source signal.

22. An encoding device according to claim 20 wherein said data signal generating means includes means for repetitively generating a group of data signals, said repetitively generated group of data signals being successively superposed on said audio program source signal.

23. An encoding device according to claim 20 including encoding means for encoding said data and for generating a serial string of encoded data.

24. A data transmission system according to claim 20 including means for repetitively superposing said data signal on said program source material comprising:

synchronous clock means for generating a clock signal having a predetermined frequency and which is synchronous with said given frequency;

means for generating coding signals; and encoding means responsive to said coding signals and to said clock signal for generating serially encoded data signals.

25. A data transmission system according to claim 20 wherein said means for generating said data signals includes means for generating digital data signals which include a plurality of signals selectively having an amplitude of a first predetermined level 1 and an amplitude of a second predetermined level 0 which is lower than said first predetermined level.

26. Apparatus for receiving and operating on a combined signal which includes repetitive synchronous data signal unit superposed within the amplitude range of the ambient noise existing in an audio program source material signal to extract said data signal from said combined signal, comprising:

synchronous sampling means for amplitude sampling said combined signal in sychronism with the data signal;

generating means coupled to said synchronous sampling means for generating signals corresponding to the amplitude values of respective samples of said data signal;

storage means;

arithmetic means coupled to said storage means and to said generating means for adding the amplitude value of a sample corresponding to a given portion of the data signal received from said generating means with the algebraic sum of the sample amplitude values corresponding to the previous occurrences of said given portion of the data signal during the previous repetitive occurrences of said data signal, said algebraic sum being received from said storage means, and for storing the resulting algebraic sum values of said samples in said storage means;

means coupled to said storage means and responsive to said sum values of said data signal samples reaching a predetermined level for indicating the presence of valid data; and output utilization means for generating a representation corresponding to said valid data.

27. A data transmission system according to claim 26 wherein said synchronous sampling means includes means for generating a synchronized clock signal and a sample and hold circuit means responsive to said synchronized clock signal and to said combined signal for sampling said combined signal.

28. A data transmission system according to claim 27 wherein said synchronized clock signal generator includes means responsive to an external synchronizing signal for generating said synchronized clock signal.

29. A data transmission system according to claim 27 wherein said synchronized clock signal generating means include a band-pass filter means for filtering a predetermined frequency signal from said combined signal, said predetermined frequency corresponding to the synchronous frequency of said data signal; a controlled oscillator responsive to the output of said band-pass filter for generating a synchronizing signal; and means responsive to said synchronizing signal for generating said synchronized clock signal.

30. A data transmission system according to claim 26 wherein said data signal generating means includes means for generating said group of digital data signals which include a plurality of signals selectively having an amplitude of a predetermined level 1 and an amplitude at a second predetermined level 0 which is lower than said first predetermined level so as to enhance synchronous sampling at said receiving means.

31. A data transmission system according to claim 28 comprising variable gain amplifier means coupling said combined signal to said synchronous sampling means.

32. A data transmission system according to claim 31 wherein said variable gain amplifier means comprises a logarithmic amplifier.

33. A data transmission system according to claim 26 wherein said synchronous sampling means includes means for generating a synchronized clock signal of a first predetermined frequency, and a means for generating a synchronized clock signal of a second frequency substantially higher than said first frequency; and means for selectively sampling said combined signal at one of said frequencies.

34. A data transmission system according to claim 33 wherein said synchronous sampling means includes means for sampling said combined signal at said second frequency to detect a peak value of a data bit which is part of said data signal.

35. A data transmission system according to claim 34 wherein said synchronous sampling means includes means responsive to said peak value detecting means for detecting the phase of the peak value of the data bit; and means for correcting the phase of said synchronized clock signal of said first predetermined frequency as a function of the phase of the peak value of the data bit.

36. A data transmission system according to claim 26 comprising an analog-to-digital converter coupling the output of said sampling means to said arithmetic means.

37. A data transmission system according to claim 26 wherein said means responsive to said sum values for indicating the presence of valid data comprises a digital comparator for comparing a sum value with a predetermined level; and shift register means coupled to the output of said comparator for storing valid data output from said digital comparator.

38. A method for transmitting data in conjunction with a program source material signal comprising:

- repetitively superposing the same synchronous data signal on the program source material signal to form a combined signal, said data signal being synchronous with a given frequency and having an amplitude level within the amplitude range of the ambient noise appearing in said program source material signal;
- transmitting said combined signal;
- receiving and operating on said combined signal to extract said data signal from said combined signal, said receiving and operating steps comprising:
- synchronously amplitude sampling said combined signal in synchronism with the synchronous frequency of said data signal;

- adding the amplitude value of a sample corresponding to a given portion of the data signal with the value corresponding to the algebraic sum of the previously sampled amplitude values of said given portion of the data signal, and storing said algebraic sum value of said amplitude values of said samples;
- comparing said algebraic sum value with a predetermined value for indicating presence of valid data upon said algebraic sum value reaching said predetermined value; and
- generating a representation corresponding to said valid data.

39. A method for receiving and operating on a combined signal which includes a repetitive synchronous data signal unit superposed within the amplitude range of the ambient noise existing in an audio program source material signal and for extracting said data signal from said combined signal, comprising:

- synchronously amplitude sampling said combined signal in synchronism with the synchronous frequency of said data signal;
- adding the amplitude value of a sample corresponding to a given portion of the data signal with the algebraic sum of the amplitude values of samples corresponding to the previous occurrences of said given portion of said data signal;
- storing said algebraic sum value of said amplitude values of said samples;
- comparing said algebraic sum value with a predetermined value for indicating the presence of valid data upon said algebraic sum value reaching said predetermined value; and
- generating a representation corresponding to said valid data.

40. A data transmission system according to claim 1, wherein said program source material is a television signal, and including means for detecting the presence of video information in said television signal.

41. A data transmission system according to claim 40, wherein said television signal includes a vertical sync signal, and said detecting means includes means responsive to the vertical sync signal of said television signal.

42. Apparatus according to claim 26, wherein said program source material is a television signal, and including means for detecting the presence of video information in said television signal.

43. Apparatus according to claim 42, wherein said television signal includes a vertical sync signal, and said detecting means includes means responsive to the vertical sync signal of said television signal.

* * * * *